(12) United States Patent
Bergvall et al.

(10) Patent No.: US 12,045,971 B2
(45) Date of Patent: Jul. 23, 2024

(54) DETECTION OF DEVIATIONS IN PACKAGING CONTAINERS FOR LIQUID FOOD

(71) Applicant: Tetra Laval Holdings & Finance S.A., Pully (CH)

(72) Inventors: Erik Bergvall, Eslöv (SE); Peter Johannesson, Malmö (SE)

(73) Assignee: Tetra Laval Holdings & Finance S.A., Pully (CH)

( * ) Notice: Subject to any disclaimer, the term of this patent is extended or adjusted under 35 U.S.C. 154(b) by 326 days.

(21) Appl. No.: 17/616,342

(22) PCT Filed: Jun. 15, 2020

(86) PCT No.: PCT/EP2020/066515
§ 371 (c)(1),
(2) Date: Dec. 3, 2021

(87) PCT Pub. No.: WO2020/254259
PCT Pub. Date: Dec. 24, 2020

(65) Prior Publication Data
US 2022/0327683 A1    Oct. 13, 2022

(30) Foreign Application Priority Data
Jun. 18, 2019   (EP) .................... 19180967

(51) Int. Cl.
*G06K 9/00*    (2022.01)
*G06T 7/00*    (2017.01)
(Continued)

(52) U.S. Cl.
CPC ........ *G06T 7/0004* (2013.01); *G06V 10/7715* (2022.01); *G06V 20/00* (2022.01); *G06T 2207/30128* (2013.01)

(58) Field of Classification Search
CPC ........ G06T 7/0004; G06T 2207/30128; G06V 10/7715; G06V 20/00
See application file for complete search history.

(56) References Cited

U.S. PATENT DOCUMENTS

| 2012/0283861 A1 | 11/2012 | Zwickl et al. |
| 2013/0173508 A1* | 7/2013 | Anayama ............. G01N 21/892 |
| | | 706/12 |
| 2018/0268257 A1* | 9/2018 | Ren ........................ G06T 7/001 |

FOREIGN PATENT DOCUMENTS

| JP | 2019040431 A | 3/2019 |
| KR | 100868884 B1 | 11/2008 |

OTHER PUBLICATIONS

Rimac-Drlje, S., A. Keller, and Z. Hocenski. "Neural network based detection of defects in texture surfaces." Proceedings of the IEEE International Symposium on Industrial Electronics, 2005. ISIE 2005.. vol. 3. IEEE, 2005. (Year: 2005).*

(Continued)

*Primary Examiner* — Avinash Yentrapati
(74) *Attorney, Agent, or Firm* — Renner, Otto, Boisselle & Sklar, LLP (57) ABSTRACT

A monitoring system implements a method for versatile and efficient detection and grading of deviations in packaging containers for liquid food in a manufacturing plant. The method comprises obtaining image data of a packaging container, or a starting material for use in producing the packaging container; analyzing the image data for detection of a current deviation; processing the current deviation in relation to a set of basis functions, which is associated with a deviation type of the current deviation, to obtain a current set of weights that represent the current deviation; and determining a current grading of the current deviation based on the current set of weights. The set of basis function may be pre-computed based on reproductions of packaging con- (Continued)

tainers or starting material comprising different magnitudes of the deviation type.

15 Claims, 4 Drawing Sheets

(51) Int. Cl.
*G06V 10/77* (2022.01)
*G06V 20/00* (2022.01)

(56) References Cited

OTHER PUBLICATIONS

Le, Tan-Toan, et al. "Inspection of specular surfaces using optimized M-channel wavelets." 2013 IEEE International Conference on Acoustics, Speech and Signal Processing. IEEE, 2013. (Year: 2013).*

International Search Report mailed Sep. 21, 2020, for priority International Patent Application No. PCT/EP2020/066515.

Tan-Toan Le et al.; Inspection of Specular Surfaces Using Optimized M-Channel Wavelets; IEEE International Conference on Acoustics, Speech and Signal Processing; May 26, 2013; pp. 2405-2409.

Luiz A.O. Martins et al.; Automatic Detection of Surface Defects on Rolled Steel Using Computer Vision and Artificial Neural Networks; 36th Annual Conference on IEEE Industrial Electronics Society; Nov. 7, 2010; pp. 1081-1086.

\* cited by examiner

DETECTION OF DEVIATIONS IN PACKAGING CONTAINERS FOR LIQUID FOOD

TECHNICAL FIELD

The present disclosure generally relates to techniques for detection of deviations in packaging containers for liquid food, and in particular detection based on image data captured in a manufacturing plant during production of the packaging containers.

BACKGROUND ART

Detection of deviations, such as defects or other deviations from an expected product configuration is critical in production lines, such as in the manufacturing of sealed packaging containers for liquid food in a filling machine or other machines used in production of such packaging containers, in order to configure optimal operating settings and ensure a desired performance over a period of time. Deviations in the produced packaging containers may lead to variations in the appearance of the packaging containers, e.g. inconsistencies that may cause concern from the consumer point-of-view, or cause sub-optimal performance, e.g. in terms of packaging container integrity or stability. There is a need for efficient, automated and reliable tools and procedures for quality control, as well as identification and grading of deviations in packaging containers for liquid food in a manufacturing plant.

SUMMARY

It is an objective of the invention to at least partly overcome one or more limitations of the prior art.

One objective is to provide for automated detection and grading of deviations in packaging containers for liquid food.

A further objective is to provide for detection of deviations of different deviation types in packaging containers for liquid food.

One or more of these objectives, as well as further objectives that may appear from the description below, are at least partly achieved by a method of detecting deviations in packaging containers for liquid food in a manufacturing plant, a method for generating a set of basis functions associated with a deviation type, a computer-readable medium, and a system according to the independent claims, embodiments thereof being defined by the dependent claims.

A first aspect of the invention is a method a method of detecting deviations in packaging containers for liquid food in a manufacturing plant. The method comprises: obtaining image data of a packaging container, or a starting material for use in producing the packaging container; analyzing the image data for detection of a current deviation; processing the current deviation in relation to a set of basis functions, which is associated with a deviation type of the current deviation, to obtain a current set of weights that represent the current deviation; and determining a current grading of the current deviation based on the current set of weights.

The first aspect provides a versatile and efficient technique that is well-suited for automated detection and grading of deviations in packaging containers for liquid food. The first aspect characterizes the detected deviations in terms of one or more weights of basis functions that are known to represent the deviation type of the detected deviations. The use of basis functions makes the detection versatile, since different sets of basis functions may be determined for different deviation types. Further, the basis functions for a deviation type may be pre-computed based on reproductions of actual deviations, and the detection and grading may thus be tailored to an actual production environment. The computation of the current set of weights yields a corresponding set of weight values that provides a "fingerprint" of the current deviation and thereby enables the current deviation to be simply and reliably assigned a quality grading, for example by use of a known and predetermined relation between values of the weights and quality gradings. By increasing the number of basis functions, and thus the number of weights combined in the fingerprint, it is possible to increase the precision of the grading.

In one embodiment, the method further comprises: mapping the current set of weights to a grading database that relates combinations of weights to gradings for the deviation type of the current deviation, wherein the current grading of the current deviation is determined based on said mapping.

In one embodiment, the processing further comprises: processing the current deviation for determination of the deviation type.

In one embodiment, the method further comprises: obtaining the set of basis functions from a basis function database as a function of the deviation type.

In one embodiment, the method further comprises: defining a current feature vector representing the current deviation; and computing the current set of weights as a function of the current feature vector and the set of basis functions.

In one embodiment, the computing the current set of weights comprises: determining projections of the current feature vector onto the set of basis functions; and determining the current set of weights based on scalar values of the projections.

In one embodiment, the basis functions are linearly independent and/or mutually orthogonal.

In one embodiment, the basis functions correspond to principal components given by Principal Component Analysis, PCA.

In one embodiment, the method further comprises: determining a time stamp for the current deviation; determining, based on the time stamp, associated production parameters of the manufacturing plant, and correlating the time stamp, the current grading and the deviation type with the production parameters.

In one embodiment, the method further comprises: communicating control instructions to a machine in the manufacturing plant comprising modified production parameters according to the current grading and/or the deviation type.

In one embodiment, the method further comprises: causing an alert notification as a function of the current grading.

In one embodiment, the deviation type comprises any of: wrinkles in a material of the packaging containers or in the starting material, unsealed flaps of the packaging containers, torn or cloudy holes in the packaging containers or the starting material, dents or bumps in the packaging containers, delamination of the packaging containers or in the starting material, and flawed patterning and/or coloring and/or holographic or metallized film of a surface of the packaging containers or the starting material.

A second aspect of the invention is a method for generating a set of basis functions associated with a deviation type for use in the method of the first aspect or any of its embodiments. The method of the second aspect method comprises: obtaining reproductions of packaging containers, or a starting material for use in producing the packaging containers, said reproductions comprising deviations of said deviation type; processing the deviations by a basis function computation algorithm to obtain one or more basis functions; and generating the set of basis functions based on the one or more basis functions.

A third aspect of the invention is a computer-readable medium comprising computer instructions which, when executed by a processor, cause the processor to perform the method of the first or second aspects or any embodiment thereof.

A fourth aspect of the invention is a system for detecting deviations in packaging containers for liquid food produced in a manufacturing plant, the system comprising a processor configured to perform the method of the first or second aspects or any embodiment thereof. The system may further comprise at least one imaging device configured to capture and provide the image data. The processor may be included in a monitoring device and operatively connected to a communication interface which is configured for connection to the at least one imaging device.

Still other objectives, as well as features, aspects and advantages of the invention will appear from the following detailed description as well as from the drawings.

BRIEF DESCRIPTION OF THE DRAWINGS

Embodiments of the invention will now be described, by way of example, with reference to the accompanying schematic drawings.

FIG. 5a shows an example of a set of basis functions for a specific deviation type, and FIG. 5b is a scatter plot of weight values determined for packaging containers having the specific deviation type and using two of the basis functions in FIG. 5a.

DETAILED DESCRIPTION

Embodiments will now be described more fully hereinafter with reference to the accompanying drawings, in which some, but not all, embodiments are shown. Indeed, the invention may be embodied in many different forms and should not be construed as limited to the embodiments set forth herein; rather, these embodiments are provided so that this disclosure may satisfy applicable legal requirements.

Also, it will be understood that, where possible, any of the advantages, features, functions, devices, and/or operational aspects of any of the embodiments described and/or contemplated herein may be included in any of the other embodiments described and/or contemplated herein, and/or vice versa. In addition, where possible, any terms expressed in the singular form herein are meant to also include the plural form and/or vice versa, unless explicitly stated otherwise. As used herein, "at least one" shall mean "one or more" and these phrases are intended to be interchangeable. Accordingly, the terms "a" and/or "an" shall mean "at least one" or "one or more", even though the phrase "one or more" or "at least one" is also used herein. As used herein, except where the context requires otherwise owing to express language or necessary implication, the word "comprise" or variations such as "comprises" or "comprising" is used in an inclusive sense, that is, to specify the presence of the stated features but not to preclude the presence or addition of further features in various embodiments. As used herein, the term "and/or" comprises any and all combinations of one or more of the associated listed items. Further, a "set" of items is intended to imply the provision of one or more items.

As used herein, "liquid food" refers to any food product that is non-solid, semi-liquid or pourable at room temperature, including beverages, such as fruit juices, wines, beers, sodas, as well as dairy products, sauces, oils, creams, custards, soups, etc, and also solid food products in a liquid, such as beans, fruits, tomatoes, stews, etc.

As used herein, "packaging container" refers to any container suitable for sealed containment of liquid food products, including but not limited to containers formed of packaging laminate, e.g. cellulose-based material, and containers made of or comprising plastic material.

As used herein, "starting material" refers to any base material that is processed to form part of a packaging container, including but not limited to sheet material of packaging laminate, closures (caps, lids, covers, plugs, foil, etc.) for closing the packaging container, labels for attachment to the sheet material or the packaging container.

As used herein, the term "deformation" is intended to generally designate any distortion of or deviation from an acceptable or ideal appearance of packaging containers. Thus, a deformation is not restricted to alterations of form or shape but also includes alterations in surface structure, surface patterning, surface coloring, etc.

As used herein, the term "basis functions" is used in its ordinary meaning and refers to linearly independent elements that span a function space so that every function in the function space can be represented as a linear combination of the basis functions. The basis functions may be represented as vectors, and the function space may be a vector space of any dimension.

Like reference signs refer to like elements throughout.

Figure 1:
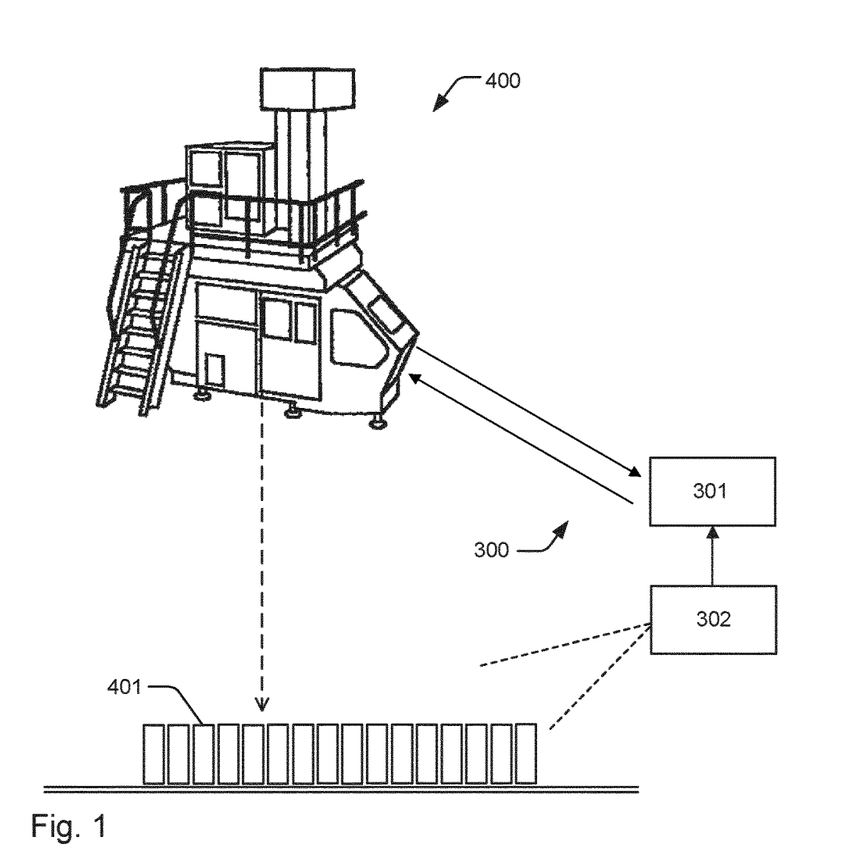
FIG. 1 is a schematic illustration of a system for detection of deviations in packaging containers.

FIG. 1a is a schematic illustration of a system 300 for detection of deviations in packaging containers 401 for liquid food produced in a manufacturing plant. The containers 401 are sealed to contain the liquid food and may be at least partly made of a laminated on non-laminated paperboard material or a plastic material. For example, the containers 401 may be cartons or bottles, which are well-known in the art.

The system 300 may be arranged to detect the deviations upstream, within or downstream of a machine 400 in the plant. The machine 400 may be a machine for feeding and/or manipulating a starting material for the container 401 or part thereof, a filling machine, a capping machine, an accumulator machine, a straw application machine, a secondary packaging machine, or any other type of packaging machine that is deployed in manufacturing plants for packaging of liquid food.

The system 300 comprises a monitoring or inspection device 301 which is configured to detect and signal deviations occurring during production of the packaging containers 401, and an imaging device 302 which is arranged and operated to capture image data of the containers 401 or the starting material, for use by the monitoring device 301. The imaging device 302 may be arranged along any part of production line(s) in the manufacturing plant. It is also conceivable that a plurality of imaging devices 302 may be arranged to capture the image data from different parts of the production line(s) and/or from different angles in relation to the containers 401, and/or with different exposure settings or image processing parameters. The image data may thus comprise multiple streams of image data captured from such a plurality of imaging devices 302.

The image data may represent the external appearance of the containers 401 or the starting material, or part thereof. In an alternative, the imaging device 302 may be configured to capture images representing internal features of the containers 401, e.g. one or more cross-sectional images. The image data may be one-dimensional, two-dimensional or three-dimensional and comprise any number of channels, e.g. a grayscale channel and/or any number of color channels.

The system 300 may be deployed for quality monitoring, for example to indicate packaging containers and/or starting material to be discarded for lack of quality, or to sort packaging containers 401 according to different quality gradings. Alternatively or additionally, the system 300 may be deployed to provide input data for a control system of one or more machines 400 in the manufacturing plant. For example, the input data may cause the control system to interrupt production in a machine or to reconfigure a machine by adjusting one or more of its current settings.

Figure 2:
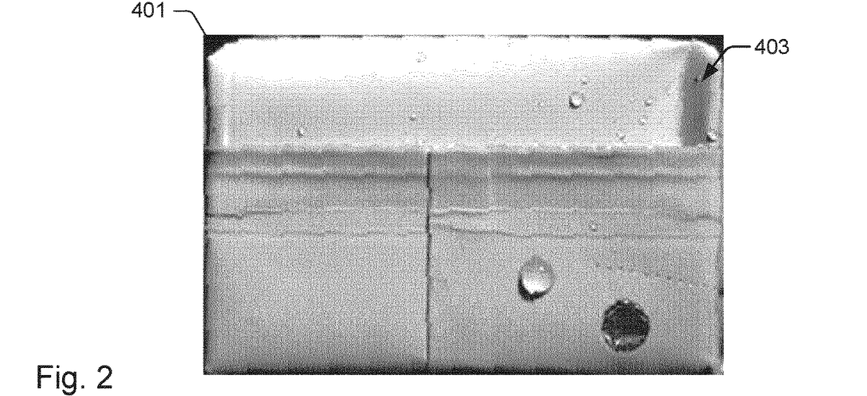
FIG. 2 is a top-down view of a packaging container having a deviation in the top-right corner.

FIG. 2 is an image of a packaging container 401 taken in top plan view by the imaging system 302. The container 401 has a deviation 403 in the top right corner, in this example a deformation in the form of a dent/bump. The monitoring device 301 is configured to process the image in FIG. 2 to determine a grading for the container in the image.

One aspect of the present disclosure relates to a detection method, which may be implemented by the system 300 and comprises: obtaining image data of a packaging container, or a starting material for use in producing the packaging container; analyzing the image data for detection of a current deviation; processing the current deviation in relation to a set of basis functions, which is associated with a deviation type of the current deviation, to obtain a current set of weights that represent the current deviation; and determining a current grading of the current deviation based on the current set of weights.

In one embodiment, the detection method is deterministic and operates on pre-computed basis functions for a specific type or class of deviations, denoted "deviation type" herein. The deviation type may be defined by a specific location on the container (or starting material) and/or a specific deformation, e.g. dents, wrinkles, unsealed flaps, torn or cloudy holes, delamination, flawed color and/or pattern of a surface, a flaw in a holographic or metallized film attached to or otherwise included on a surface, imperfect embossing or folding, etc. In one example, the deviation type may be a specific deformation, irrespective of location. In another example, the deviation type may be any deformation at a specific location. Many variants are conceivable and readily appreciated by the person skilled in the art.

The set of basis functions may have been pre-computed by use of any suitable basis function computation algorithm that renders linearly independent basis functions based on feature vectors representing the deviation type in a plurality of containers (or items of starting material). Examples of such computation algorithms include, without limitation, Principal Component Analysis (PCA), Independent Component Analysis (ICA), Wavelet analysis, Non-negative Matrix Factorization (NMF), Fourier analysis, Autoregression analysis, Factor Analysis, Common Spatial Pattern (CSP), Canonical Correlation Analysis (CCA), etc. Such computation algorithms define a model function for observations in terms of a set of basis functions. Often a generic linear model function is assumed: $X=\Sigma(wi \cdot \phi i)$, where X is an observation, ($\phi i$ is a respective basis function, and wi is a respective weight or basis function coefficient. The basis functions are linearly independent. For better conditioning, some computation algorithms may also impose orthogonality among the basis functions. In the following, examples will be given with respect to PCA, which is a statistical procedure that uses a transformation to convert a set of observations of correlated variables into a set of values of linearly uncorrelated basis functions called "principal components". The number of principal components is less than or equal to the number of original variables. The transformation is defined in such a way that the first principal component has the largest possible variance, i.e. accounts for as much of the variability in the data as possible, and each succeeding component in turn has the highest variance possible under the constraint that it is uncorrelated with the preceding components. Thus, PCA results in a number of principal components for the set of observations and a variance for each principal component. The variance is or corresponds to the above-mentioned weight for the respective basis function.

Figure 3:
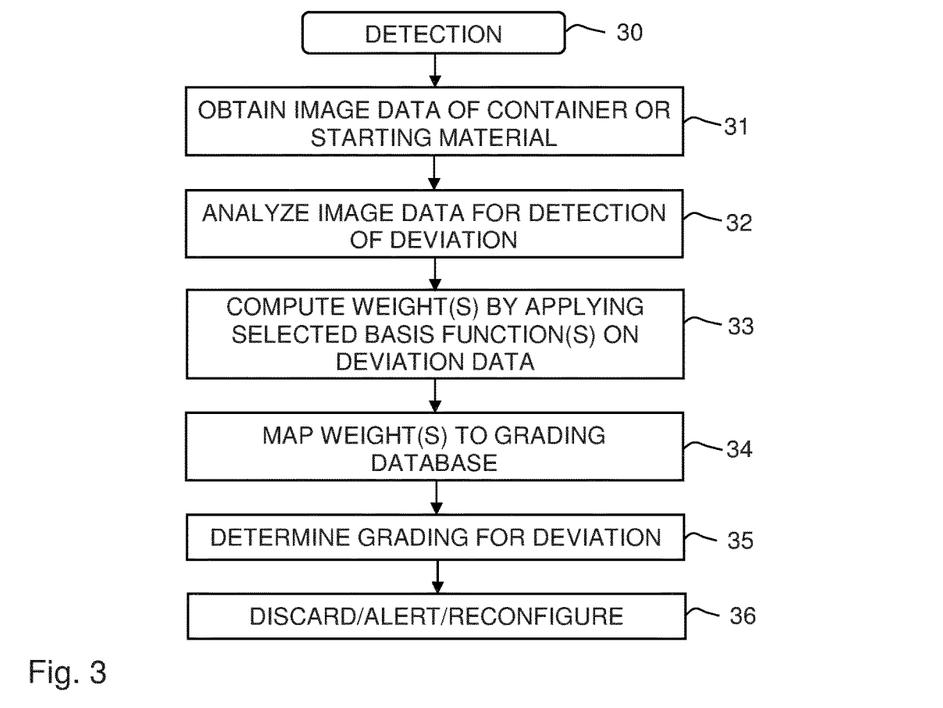
FIG. 3 is a flowchart of an example method for detection of deviations.
Figure 4:
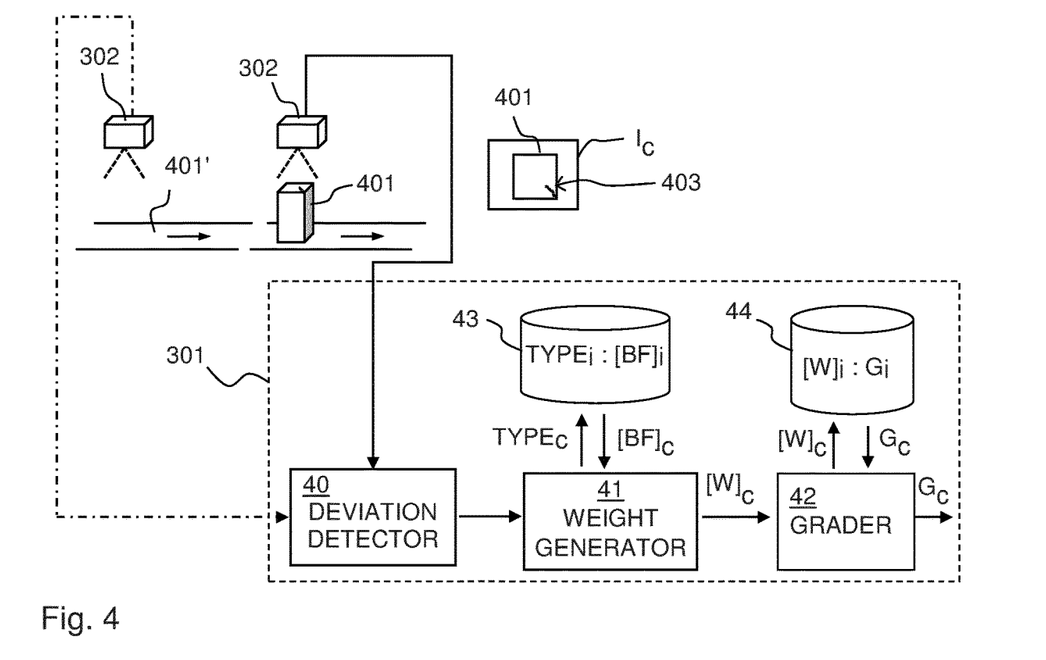
FIG. 4 is a schematic illustration of a system for deviation detection when operative in a manufacturing plant.

The detection method will now be exemplified with reference to the flow chart in FIG. 3 and an exemplifying monitoring system in FIG. 4. The monitoring system comprises an imaging system 302 which is arranged to capture images of containers 401 and/or starting material 401' (illustrated as a sheet of packaging material) in a manufacturing plant. The monitoring device 301 comprises a deviation detector 40, a weight generator 41 and a grader 42. The monitoring device 301 is arranged to access a first database 43 which stores a pre-computed dictionary of basis functions, and a second database 44 which stores grading data. The databases 43, 44 may be part of the monitoring device 301, as shown, or located on one or more external devices and accessed by the monitoring device 301 over a wired or wireless connection.

The illustrated detection method 30 comprises a step 31 of obtaining current image data of one or more containers 401 or the starting material 401'. The current image data may be exemplified by the image Ic in FIG. 4, which depicts a container 401 with a deviation 403. Step 32 analyzes the current image data Ic for detection of a current deviation. In one example, step 32 compares the current image data Ic, or a selected subset thereof, to a reference image of a deviation-free container or starting material to detect presence of a current deviation. In another example, step 32 extracts values of one of more characterizing parameters from the current image data and compares the values to one or more reference values to detect the presence of a current deviation. If no deviation is detected by step 32 the method 30 will return to step 31. In the system of FIG. 4, steps 31 and 32 may be performed by the deviation detector 40.

Otherwise, the method proceeds to step 33 which determines current deviation data representative of the current deviation and computes a current set of weights that yields the best approximation, according to a predefined criterion, of the current deviation when applied to linearly combine a set of predefined basis functions, i.e. in correspondence with the model function $X=\Sigma(wi \cdot \phi i)$. Step 33 may compute any number of weights, including a single weight. The current deviation data is determined in the same format as the observations that were used for determining the set of predefined basis functions. The current deviation data represents the current deviation by a plurality of numeric values that are extracted from the current image data Ic. The current deviation data may thus be denoted a current "feature vector" of one or more dimensions. In one embodiment, the feature vector represents the geometry of the deviation, e.g. its shape and/or topography. As used herein, "topography" is the distribution of height values in relation to a geometric reference, e.g. a two-dimensional geometric plane. In the example of the dent 403 in FIG. 2, the topography may designate the variations in height perpendicular to a geometric plane parallel to the top surface of the container 401. The topography may be represented as height values along a line, e.g. along a deviation, such as a wrinkle, or along a predefined reference line. Alternatively or additionally, the topography may be represented as a 2D distribution of height values. In a further example, the feature vector may define the curvature at different locations within the deviation, e.g. along a line or in two dimensions. Any suitable definition of curvature may be used, including conventional measures of intrinsic and external curvature in two or three dimensions. In another example, the feature vector may represent a computed difference, in one or more dimensions, between the image data and a reference template that corresponds to a container (or starting material) without the deviation. It is also conceivable that the feature vector comprises a combination of different metrics, e.g. any of the foregoing.

In one embodiment, step 33 determines projections of the current feature vector onto the set of basis functions, and determines the current set of weights based on scalar values of the projections. For example, the respective weight may be computed as a dot product (scalar product) between the feature vector and the respective basis function.

In the system of FIG. 4, step 33 may be performed by the weight generator 41 and the set of basis functions may be retrieved from the first database 43. In FIG. 4, the current set of weights that is computed by the weight generator 41 for the current image data Ic is designated by [W]c.

The foregoing description presumes that the method 30 is tailored to detect a specific deviation type, since the precomputed set of basis functions is generally only applicable to a specific deviation type. In a more generic embodiment of method 30, step 33 may process the current deviation to assign the current deviation to one of a number of predefined deviation types, and retrieve a corresponding set of basis functions for the current deviation type, e.g. from the first database 43. As indicated in FIG. 4, the first database 43 may store different sets of basis functions, designated by [BF]i, for different deviation types, designated by TYPEi. Thus, in the example system of FIG. 4, step 33 may involve determining a current deviation type TYPEc for the current deviation, and accessing the first database 43 to retrieve a current set of basis functions, [BF]c, associated with the current deviation type, TYPEc.

Step 34 maps the set of weights computed by step 33 to grading data in a grading database. It should be understood that the grading database may store grading data for each deviation type. In one embodiment, the grading data associates values of one or more weights with a grading. For example, the grading data may define a "weight space" and associate different regions in the weight space with a respective grading, where each weight in the set of weights define a dimension of the weight space. For example, if the set of weights comprises four weights, the weight space has four dimensions and the above-mentioned regions are defined in the four-dimensional weight space. Step 35 determines a current grading or ranking of the current deviation based on the mapping in step 34. The grading may indicate the magnitude (severity) of the current deviation for the appearance and/or function of the packaging container 401. The grading may be assigned in any number of gradings, levels or ranks. In one non-limiting example, the grading is binary and may designate the packaging container as being either acceptable or non-acceptable.

In the system of FIG. 4, steps 34-35 may be performed by the grader 42, and the grading database corresponds to the second database 44, in which the above-mentioned regions are designated by [W]i, the respective associated grading is designated by Gi, and the current grading is designated by Gc.

Figures 5A, 5B:
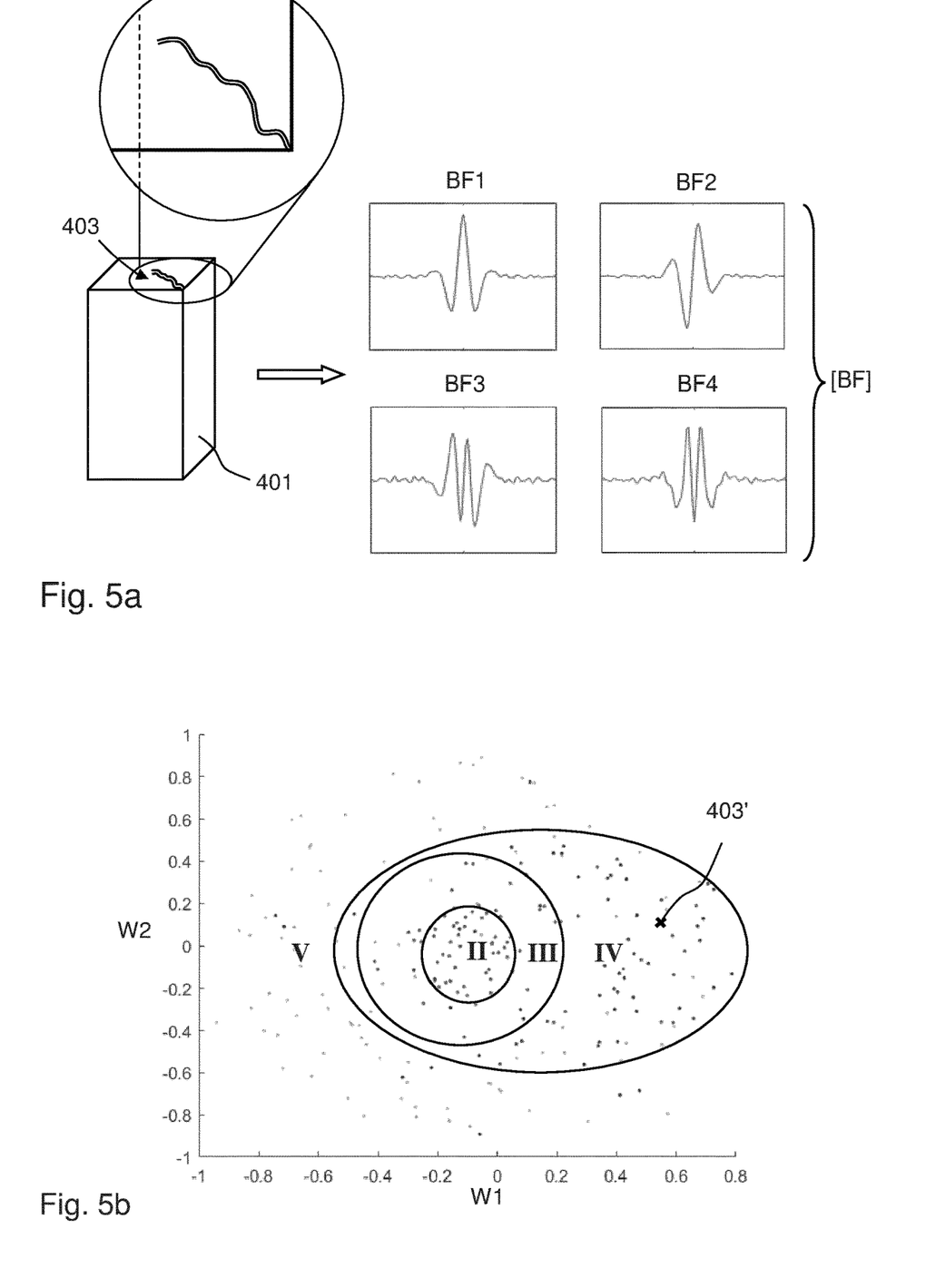

To further facilitate understanding of the method 30, FIG. 5a illustrates a set of basis functions, [BF], that has been pre-computed for a specific deviation type by operating a PCA algorithm on feature vectors derived from image data of a large number of containers with deviations 403 of a specific deviation type. Thus, the basis functions BF1-BF4 are principal components produced by the PCA algorithm. In this particular example, the feature vectors and the basis functions are one-dimensional and represent curvature at points along a line in the image data. FIG. 5b illustrates a weight space determined for basis functions BF1 and BF2 in FIG. 5a. The weight space is thus defined by a weight W1 for BF1, and a weight W2 for BF2. Each point in FIG. 5b is calculated for a deviation of an individual container as detected in image data. FIG. 5b also indicates grading regions in the weight space, where the different grading regions are assigned a respective grading II-V, where the magnitude of the deviation decreases from II to V. The grading has been determined by ocular inspection and manual grading of the deviation of the containers corresponding to the points in FIG. 5b. In this particular example, it is possible to assign a grading to the respective container based on the weights W1, W2. In FIG. 5b, the cross 403' illustrates the result of a mapping by step 34 of a current deviation to the weight space, where the current deviation has been detected by step 32 and has been assigned current values of the weights W1, W2 by step 33. In this example, step 35 may assign grading IV to the current deviation.

It should be realized that the use of basis functions gives great freedom in adapting the method 30 to grade deviations of different deviation types. For each deviation type, different definitions of the feature vector may be tested, e.g. by computing a respective scatter plot of the type shown in FIG. 5b, to achieve a desired accuracy and specificity in the grading.

Reverting to FIG. 3, the method 30 may further comprise a step 36 of providing feedback to an operator and/or a control system in the manufacturing plant. In one example, step 36 signals that the current container 401 or starting material 401' should be discarded. In another example, step 36 generates an alert notification indicative of a production error, and optionally causes one or more machines to be stopped. The alert notification may depend on and/or be indicative of the current grading and/or the deviation type.

In a further example, step 36 causes or facilitates a reconfiguration of one or more machines in the manufacturing plant. In one such embodiment, step 36 comprises a sub-step of determining a time stamp for the current deviation. Optionally this sub-step may be performed only if the current grading exceeds a grading limit. The time stamp may be given with reference to a master clock within the manufacturing plant. Step 36 may further comprise a sub-step of determining, based on the time stamp, associated production parameters of the manufacturing plant. Accordingly, when the current deviation is detected and the associated time stamp is defined, step 36 is configured to obtain production data comprising parameters of the production process at or before the time stamp. The production data may be obtained from a control system in the manufacturing plant. The production parameters may comprise any parameter associated with the chain of the production of the packaging containers 401, such as settings and/or sensor data in one or more machines, and/or properties of the starting material 401' or the liquid food to be sealed therein. Step 36 may comprise a further sub-step of correlating the time stamp, the current grading and the deviation type with the production parameters. By this correlation, step 36 is capable of accurately characterizing the origin and circumstances of the formation of the current deviation. This allows facilitated optimization of the production line and provides a reliable tool for deviation detection. In one embodiment, step 36 may further communicate control instructions to a machine in the production plant comprising modified production parameters according to the current grading and/or the deviation type.

Figure 6:
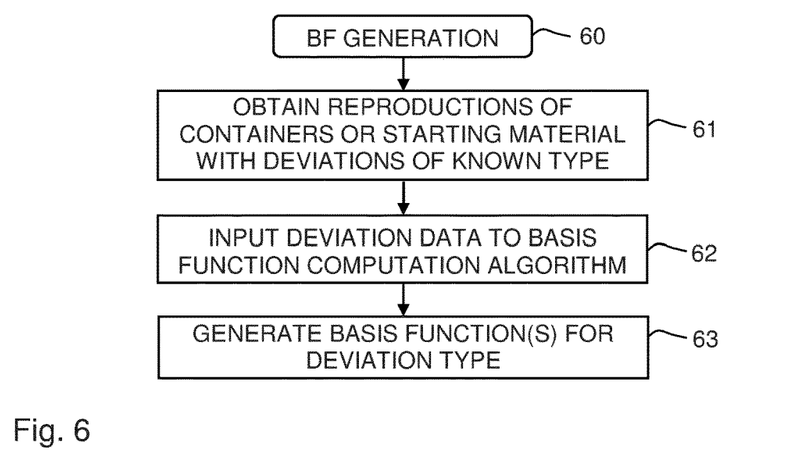
FIG. 6 is a flowchart of an example method for generation of basis functions.
Figure 7:
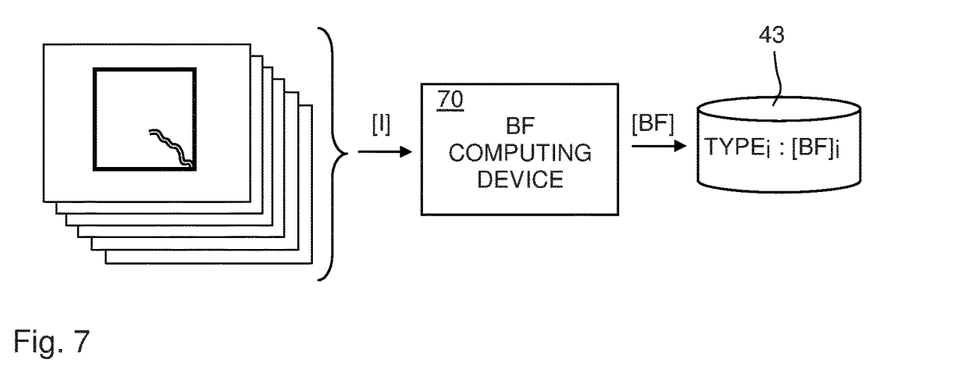
FIG. 7 is functional block diagram of a system for generating basis functions.

Another aspect of the present disclosure relates to a method for generating a set of basis functions associated with a deviation type. An embodiment of the method 60 is depicted in FIG. 6. Step 61 obtains a plurality of reproductions of containers 401, or a starting material 401' for use in producing the containers 401. The reproductions comprise deviations of the specific deviation type and may be in the form of image data, e.g. as indicated by [I] in FIG. 7. The reproductions preferably depict containers with deviations of different magnitude. Step 62 processes the deviations in the reproductions by a basis function computation algorithm to compute basis functions, e.g. the basis functions BF1-BF4 as exemplified in FIG. 5a. Step 63 generates the pre-defined set of basis functions, [BF], to be used by the detection method 30. For example, step 63 may involve selecting a subset of the basis functions generated by step 62, scaling the basis functions, etc. As shown in FIG. 7, the generation method 60 may be performed by a dedicated basis function computing device 70, which is configured to store the set of basis functions, [BF], in the first database 43. The computing device 70 may execute the generation method 60 for different deviation types, and store a respective set of base functions, [BF]i, in association with the deviation type, TYPEi, in the first database 43.

Figure 8:
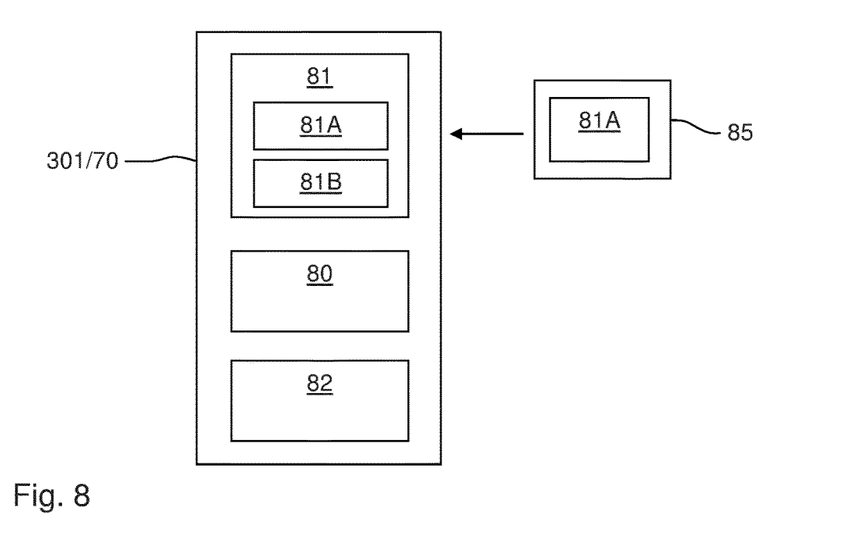
FIG. 8 is a block diagram of a device that may implement methods in accordance with some embodiments of the present disclosure.

FIG. 8 is a block diagram of an example structure of the monitoring device 301 of FIGS. 1 and 4 or the computing device 70 of FIG. 7. In the illustrated example, the device 301/70 comprises a processing system 80 and a memory 81. The processing system 80 may include any commercially available processing device, such as a CPU, DSP, GPU, microprocessor, ASIC, FPGA, or other electronic programmable logic device, or any combination thereof. The processing system 80 may be configured to read executable computer program instructions 81A from the memory 81 and execute these instructions to control the operation of the device 301/70, e.g. to perform any of the methods described herein. The program instructions 81A may be provided to the device 301/70 on a computer-readable medium 85, which may be a tangible (non-transitory) product (e.g. magnetic medium, optical disk, read-only memory, flash memory, etc.) or a transitory product, such as a propagating signal. The memory 81 may be, for example, one or more of a buffer, a flash memory, a hard drive, a removable media, a volatile memory, a non-volatile memory, a random access memory (RAM), or other suitable device. As indicated in FIG. 8, the memory 81 may also store data 81B for use by the processing system 80, e.g. the first and second databases 43, 44. The device 301/70 further comprises one or more communication interfaces 82 for operatively connecting the device 30/701 to an external device by wire or wirelessly, e.g. to access the first database 43 and/or the second database 44, to receive the image data from the imaging device(s) 302, to provide the alert notification and/or control instructions, etc.

The invention claimed is:

1. A method of detecting deviations in packaging containers for liquid food in a manufacturing plant, said method comprising:
  obtaining image data of a packaging container, or a starting material for use in producing the packaging container;
  analyzing the image data for detection of a current deviation;
  processing the current deviation in relation to a set of basis functions, which is associated with a deviation type of the current deviation, to obtain a current set of weights that represent the current deviation; and
  determining a current grading of the current deviation based on the current set of weights.

2. The method of claim 1, further comprising: mapping the current set of weights to a grading database that relates combinations of weights to gradings for the deviation type of the current deviation, wherein the current grading of the current deviation is determined based on said mapping.

3. The method of claim 1, wherein said processing further comprises: processing the current deviation for determination of the deviation type.

4. The method of claim 1, further comprising: obtaining the set of basis functions from a basis function database as a function of the deviation type.

5. The method of claim 1, further comprising: defining a current feature vector representing the current deviation; and computing the current set of weights as a function of the current feature vector and the set of basis functions.

6. The method of claim 5, wherein said computing the current set of weights comprises: determining projections of the current feature vector onto the set of basis functions; and determining the current set of weights based on scalar values of the projections.

7. The method of claim 1, wherein the basis functions are linearly independent and/or mutually orthogonal.

8. The method of claim 1, wherein the basis functions correspond to principal components given by Principal Component Analysis, PCA.

9. The method of claim 1, further comprising: determining a time stamp for the current deviation; determining, based on the time stamp, associated production parameters of the manufacturing plant, and correlating the time stamp, the current grading and the deviation type with the production parameters.

10. The method of claim 9, further comprising:
  communicating control instructions to a machine in the manufacturing plant comprising modified production parameters according to the current grading and/or the deviation type.

11. The method of claim 1, further comprising: causing an alert notification as a function of the current grading.

12. The method of claim 1, wherein the deviation type comprises any of: wrinkles in a material of the packaging containers or in the starting material, unsealed flaps of the packaging containers, torn or cloudy holes in the packaging containers or the starting material, dents or bumps in the packaging containers, delamination of the packaging containers or in the starting material, and flawed patterning and/or coloring and/or holographic or metalized film of a surface of the packaging containers or the starting material.

13. A method for generating a set of basis functions associated with a deviation type for use in the method of claim 1, said method comprising:
- obtaining reproductions of packaging containers, or a starting material for use in producing the packaging containers, said reproductions comprising deviations of said deviation type;
- processing the deviations by a basis function computation algorithm to obtain one or more basis functions; and
- generating the set of basis functions based on the one or more basis functions.

14. A non-transitory computer readable medium comprising computer instructions which, when executed by a processor, causes the processor to perform the method according to claim 1.

15. A system for detecting deviations in packaging containers for liquid food produced in a manufacturing plant, said system comprising a processor configured to perform the method according to claim 1.

* * * * *